Jan. 14, 1969          R. K. McKIBBEN          3,421,623
VIBRATORY SEPARATOR
Filed Nov. 28, 1966

INVENTOR.
RICHARD K. McKIBBEN
BY
Julian J. Schramm
ATTORNEY 3,421,623
VIBRATORY SEPARATOR
Richard K. McKibben, La Canada, Calif., assignor to Southwestern Engineering Company, Los Angeles, Calif., a corporation of California
Filed Nov. 28, 1966, Ser. No. 597,397
U.S. Cl. 209—243           10 Claims
Int. Cl. B07b 1/28

ABSTRACT OF THE DISCLOSURE

A vibratory separator including a screening structure mounted in a housing, the screening structure including a first portion having a central discharge opening therein and a second portion upstanding at near the periphery of the first portion such that material which does not flow through the second portion is delivered to the first portion near the periphery thereof. A feed material arrangement is provided adjacent the second portion of the screening structure for delivering material to be separated adjacent the inside surface of the second portion, preferably substantially tangentially thereto, the feed arrangement including at least one feed pipe having an elongated opening therein to allow material to be fed to the second portion along substantially the entire height thereof.

---

The present invention is an improvement on the "Vibratory Separator" described in U.S. Patent application Ser. No. 597,278, filed Nov. 28, 1966, by Walter J. Talley, Jr., and asigned to the assignee of the present application.

This invention relates to vibratory separators of the type useful in separating solids of different sizes and separating solids from liquids. The invention is particularly directed with means and methods for improving the operation of such a device so as to aid in the distribution of material onto the screen surface in a manner that increases the effectiveness of such screen.

Although a horizontal screen vibratory separating device of the type disclosed, for example, in U.S. Patents 3,035,700, 3,156,643, 3,029,946, 2,777,578, 2,753,999, 2,714,961, 2,696,302, 2,676,706, and 2,284,671 gives a great deal of flexibility in the separation of material by the selection of proper screen size and the appropriate adjustment of the vibrating device which drives it, there have been certain applications in which the vibratory screen apparatus has not been as successful as it might be.

For example, when using the conventional vibrating screen separator to remove a relatively small amount of solids from a large volume of liquid, the capacity of the sepaartor is materially retarded by the limited surface area of the horizontal screen because there is a finite rate at which the liquid will pass through the screen, particularly in the presence of the solids, which tend to concentrate on the screen surface. In such instance, the capacity of the separator to remove the relatively small amount of solids is limited by the ability to move the solids across the screen and agglomerate the solids into larger particles so that a maximum open screen area is available to the liquid.

It has been proposed that when a vibratory separator is employed to remove a small amount of solids from a large volume of liquid, and additional screen be employed with the conventional horizontal screen, comprising a circumferentially complete screen adjacent to and vertically projecting from the periphery of the horizontal screen. The additional screen area as provided for by the collar screen substantially increases the capacity of the separator.

With the additional screen area as provided by the collar screen a feed distribution arrangement is required which will further utilize a maximum screen upon which to distribute materials, thereby substantially increasing the capacity of the vibratory separator employing a collar screen.

It is, therefore, an object of this invention to provide an improved vibratory separator.

It is another object of this invention to provide an improved vibratory separator having a vertical screen in conjunction with a horizontal screen in which material is initially fed to the vertical screen.

Still another object of the invention is a provision of a novel and improved feed mechanism for a vibratory screen unit having a circumferential vertical screen.

With the above objects in mind and other objects which may hereinafter appear, reference is directed to the drawings accompanying the specification in which.

The above and other objects of the invention are accomplished by a vibratory separator, comprising: a housing structure; a first planar screen having its outer periphery secured to the housing structure, and a central discharge opening; a second screen; means comprising at least one feed pipe adjacent the second screen for delivering material to be separated to the second screen adjacent its inside surface the pipe terminating in an elongated sparger such that material is fed to the second screen along substantially its entire height; the second screen positioned above the first screen such that no portion of the second screen is in a plane parallel to the first screen and such that any of the material which does not flow through the second screen is delivered to the first screen at near the periphery thereof; means for vibrating the housing structure and the first screen to cause movement of the material from the outer periphery of the first screen toward the discharge opening for discharge of the oversize component of the material therethrough; means under the first screen for receiving the component of the material passing through the first screen; means communicating with the second screen for receiving the components of the material passing through the second screen; means communicating with the central opening of the first screen to receive the oversize component of the material.

Figure 1:
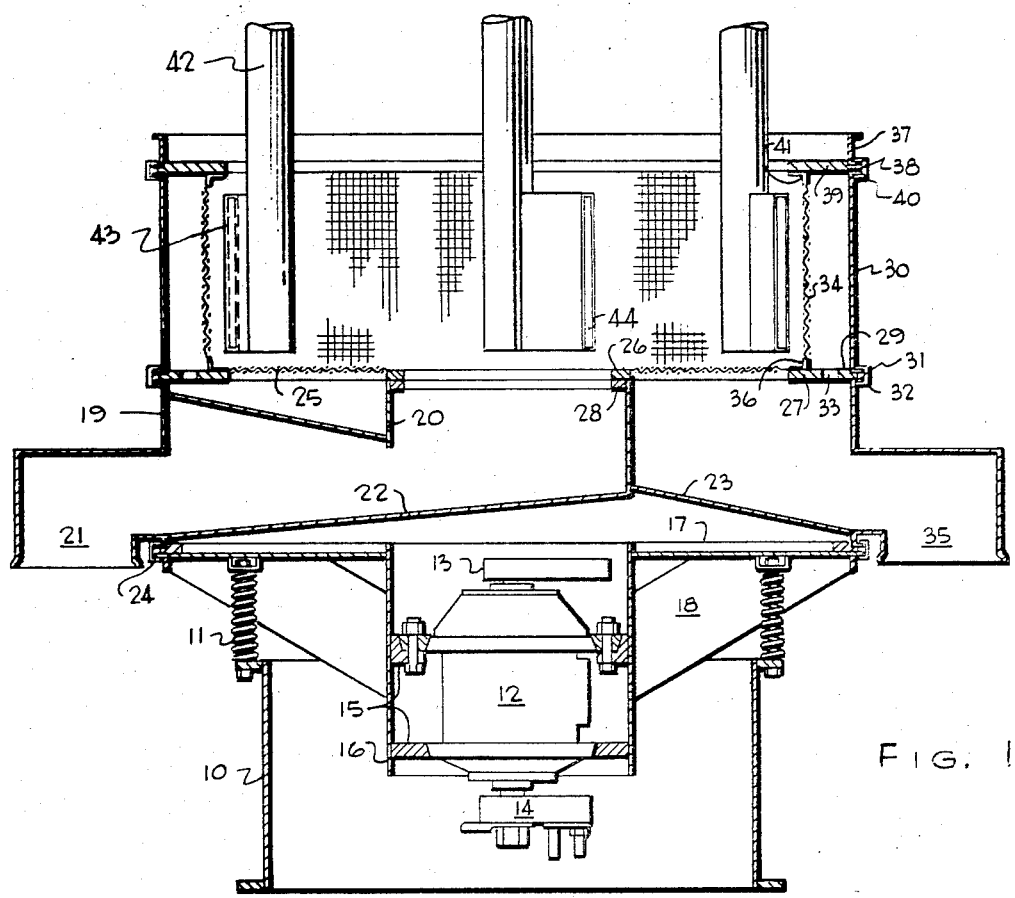
FIGURE 1 is a sectional view of a vibratory screening apparatus of this invention having a circular configuration.

The vibratory shaking or screening device, as shown in FIGURE 1, consists of a base frame 10 on the upper portion of which is mounted a ring of springs 11 which supports the vibratory screening device and isolates the vibrations imparted upon such device from the base frame 10.

A vibratory unit comprising a motor 12 and upper and lower eccentric weights 13 and 14 respectively, is mounted by means of the mounting brackets 15 to a cylindrical extension 16 of the upper base 17 which is supported on the ring of springs 11 and is reinforced by gusset plates 18 which project between the springs 11.

The relationship of the vibratory unit and the base frame 10, as described above, may be varied by other arrangements. For example, a motor may be mounted upon the base frame 10. A belt drive from such motor extends to and rotates the eccentric weights which are mounted on the upper base 17.

On the upper base frame 17 is mounted a cylindrical spacing frame 19 having a discharge duct 21 projecting therefrom and communicating with a cylindrical opening 20 in the approximate center through the sloping pan 22.

Secured to the interior of the spacing frame 19 is a sloping receiving pan 23 which is inclined and which is isolated from the interior of the discharge duct 21 by the walls of the opening 20. The pan 23 slopes upwardly from the lower portion of the frame 19 adjacent the duct 35 to a point diametrically opposite the duct 35 and adjacent to the upper edge of the frame 19. At the bottom of the frame 19 is a clamp ring 24 which secures the lower edge of the frame 19 to the upper base 17.

The inner periphery and outer periphery of the horizontal screen 25 are secured to inner and outer tension rings 26 and 27 respectively, thus forming a rigid single unit. The inner periphery of the horizontal screen 25 is affixed to the inner tension ring 26 by spot welding, bonding or other suitable means.

The outer periphery of the horizontal screen 25 rests upon an outer marginal tension ring 27, and is bonded, spot welded or otherwise affixed thereto. Upon affixing the peripheries of the screen 25 to their appropriate tension rings 26 and 27, the screen 25 and tension rings 26 and 27 form a single, rigid and removable unit.

The screen assembly 25, 26 and 27 is placed onto the vibratory separator unit whereby the inner tension ring 26 rests upon and is secured in a suitable manner (such as by bolting) to a flange or lip 28 which projects inwardly from the upper end of cylindrical opening 20.

A lip 29 projects outwardly from the outer margin of tension ring 27, the flange 29 being interposed between spacing frames 19 and 30 and resting upon a flange 31 which projects outwardly from the upper periphery of the spacing frame 19. A clamp ring 32 secures the spacing frames 19 and 30 and the interposed flange 29 of the tension ring 27. The outer tension ring 27 is provided with a series of openings 33, such openings permitting the undersize liquid or other materials which pass through the adjacent collar screen 34 to fall onto the receiving pan 23 and ultimately become discharged through the discharge duct 35.

Before the collar screen 34 is assembled onto the separator unit, the lower periphery of the screen 34, is bonded, spot welded or otherwise secured to the outer side of the vertical projection of a circular flange 36. The horizontal projection of the circular flange 36, with the screen 34 attached to the outer side of the vertical projection, is attached to the tension ring 27 by inserting bolts (not shown) through the corresponding holes (not shown) in the horizontal projection of the flange 36 and into the tension ring 27, such holes being internally threaded to receive the bolts. Alternatively, the holes in the tension ring 27 are drilled completely through the ring 27 and the bolts held with lock nuts.

Interposed between the spacing frames 30 and 37 is a flange 38 projecting from a circular supporting ring 39. A clamp ring 40 secures the spacing frames 30 and 37 and support ring 39. The upper periphery of the collar screen 34 is affixed by bonding, spot welding, or other suitable means, to the outer side of the vertical projection of a flange 41 in the same manner as was the lower periphery of the screen 34 as previously described. A series of bolts (not shown) at predetermined locations circularly upon the horizontal projection of the flange 41, passes through the corresponding holes (not shown) in the flange 41 and also through the circular support ring 39. Tensioning of the collar screen 34 is accomplished by the bolts and tensioning nut which is provided at the upper end of the bolt. The construction details of the screen assembly are shown in greater detail in said patent application entitled "Vibratory Separator" by Walter J. Talley, Jr.

The vibratory separator functions to separate materials of two different sizes (or liquid from solid) through the screen 25 and its adjacent collar screen 34, by virtue of the vibratory motion imparted by the vibratory unit, including upper and lower eccentric weights 13 and 14, and by a feed arrangement by which material is forcefully projected from a feed means against the screen 34 and then onto the horizontal screen 25. The vibratory motion causes the material to move along the screen 25; the oversize portion of the material being discharged through the discharge spout 21. The undersize material which passes through the collar screen 34 falls through the provided openings 33 in the tension ring 27 and is ultimately discharged through the discharge duct 35. Undersize material falling through the screen 25 falls onto the receiving pan 23 and is ultimately discharged through the discharge port 35.

The collar screen 29, which provides a greater area over which the material to be separated may pass, thereby increasing the capacity of the separator, is particularly useful when a large volume of liquid is to be separated from a relatively small quantity of solids. In such instance, the tangential feed arrangement of this invention forcefully projects the liquid-solid material onto the screen 34, resulting in a radial movement of the material which causes the material to be forced against the side screen 34. The major volume of liquid passes through the side screen 34 while the remaining volume passes through the horizontal screen 25 and the oversize materials are discharged through the center discharge duct 20.

Although in liquid-solid separations the collar screen 34 substantially increases the capacity of the separator by providing a greater area over which the great volume of liquid may pass, the feeding means whereby material is fed by way of feed pipe tangentially entering and affixed to the collar screen, substantially retards the effective screen area of the separator by not utilizing the entire screen area provided by the collar screen 34. In such instance, the material is forced only against that portion of the periphery of the collar screen 34 just adjacent and below the feed pipe.

By the present invention, comprising an internal feed pipe which forcefully distributes material tangentially upon the periphery of substantially the entire vertical area of the collar screen 34, the increased area of screen provided by the proposed collar screen 34 is fully employed thereby resulting in an improved separator and the liquid is effectively passed over a larger screen area.

Figure 2:
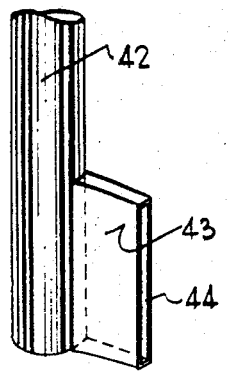
FIGURE 2 is an isolated perspective of the feed distributing means.
Figure 3:
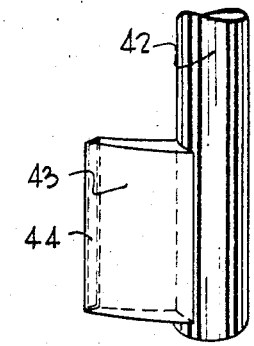
FIGURE 3 is an isolated perspective of the feed means from a different angle.

This is accomplished as illustrated in FIGURE 1 by a feed pipe 42 disposed parallel to the collar screen 34 and adjacent to the horizontal screen 25. Affixed to the lower portion of the feed pipe 42, by bonding, welding, or other suitable means, is an elongated sparger 43 which extends vertically to substantially the entire vertical length of the collar screen 34. As best shown in FIGURES 2 and 3, the elongated sparger curves in a manner which is complementary to the curvature of the collar screen 34. The thickness of the sparger 43, from its point of contact with the feed pipe 42 to the opening, decreases.

The material passes through the feed pipe 42 and enters the elongated sparger 43. As a result of the converging thickness of the sparger 43, the material, consisting of liquid, solid, or semi-solid, is projected from the opening 44, as a thin sheet. By virtue of the sparger 43 being curved in a manner complementary to the curvature of the collar screen, which circumferentially surrounds the feed arrangement, the projected sheet of material is distributed tangentially upon the entire periphery of the collar screen. The feeding arrangement, as above described, may be employed singularly, or consist of any desired number of elongated spargers 43 connected to feed pipes 42 which extend from either the same or separate feed pipes. It is to be noted that the effective mesh size of the collar screen 34 is changed by the tangential feed arrangement of this invention. The hole size as "seen" by the material contacting the screen is smaller than if the material were projected against the screen perpendicular to the tangent of the circle formed by the screen 34.

While particular embodiments of this invention have been shown and described, it is not intended to limit the same to the exact details of the construction set forth and it embraces such changes, modifications and equivalents of the parts and their formation and arrangement as come within the purview of the appended claims.

I claim:

1. A vibratory separator comprising
 a housing structure,
 a first planar screen having its outer periphery secured to said housing structure, and having a central discharge opening,
 a second upstanding screen,
 means comprising at least one feed pipe adjacent said second screen for delivering material to be separated to said second screen adjacent its inside surface said pipe terminating in an elongated sparger such that material is fed substantially tangentially to said second screen along substantially its entire height,
 said second screen positioned above said first screen such that no portion of said second screen is in a plane parallel to said first screen and such that any of said material which does not flow through said second screen is delivered to said first screen at near the periphery thereof,
 means for vibrating said housing structure and said first screen to cause movement of said material from the outer periphery of said first screen toward said discharge opening for discharge of the oversize component of said material therethrough said means for vibrating including spaced and rotatable eccentric weights,
 means under said first screen for receiving the component of said material passing through said first screen,
 means communicating with said second screen for receiving the component of said material passing through said second screen, and
 means communicating with the central opening of said first screen to receive the oversize component of said material.

2. A vibratory separator comprising
 a housing structure,
 a first screen secured to said housing structure and having a central discharge opening therein,
 a second upstanding screen, said second screen extending upwardly above said first screen near the periphery of said first screen to enable material fed to said separator which does not flow through said second screen to be delivered to said first screen near the periphery of said first screen,
 feed means adjacent said second screen for delivering material to be separated to said second screen adjacent an inside surface thereof, said feed means including at least one feed pipe having an elongated opening therein to allow material to be fed to said second screen along substantially the entire height thereof,
 means under said first screen for receiving a component of said material passing through said first screen,
 means communicating with said second screen for receiving a component of said material passing through said second screen,
 discharge means communicating with the central opening in said first screen for receiving an oversize component of said material, and
 vibratory means coupled with said housing structure for vibrating said housing structure and said first screen to cause movement of said material from the outer periphery of said first screen toward said discharge opening therein for discharge of said oversized component of said material said means for vibrating including spaced and rotatable eccentric weights.

3. A separator as in claim 2 wherein
 said pipe of said feed means terminates in an elongated sparger.

4. A separator as in claim 2 wherein
 the elongated opening in said pipe of said feed means is disposed with respect to said second screen to cause material to be fed substantially tangentially to said second screen along substantially the entire height thereof.

5. A separator as in claim 2 wherein
 said feed means includes a plurality of feed pipes adjacent said second screen for delivering material to be separated to said second screen adjacent its inside surface, said feed pipes each having an elongated opening therein for allowing material to be fed to said second screen along substantially the entire height thereof.

6. A separator as in claim 5 wherein
 the elongated opening in said pipe of said feed means is disposed with respect to said second screen to cause material to be fed substantially tangentially to said second screen.

7. A separator as in claim 2 wherein
 said feed means includes a plurality of feed pipes each having an elongated sparger disposed with respect to said second screen to cause material to be fed substantially tangentially to said second screen.

8. A vibratory separator comprising
 a housing structure,
 a screening structure mounted in said housing structure, said screening structure including a first portion which has a central discharge opening therein, and having a second portion upstanding at near the periphery of said first portion such that material fed to said screening structure which does not flow through said second portion is delivered to said first portion near the periphery of said first portion,
 feed means adjacent said second portion of said screening structure for delivering material to be separated to said second portion adjacent its inside surface, said feed means including at least one feed pipe having an elongated opening therein to allow material to be fed to said second portion along substantially the entire height thereof,
 discharge means communicating with said screening structure for receiving components of said material passing through said first and second portions thereof,
 discharge means communicating with the central opening in said first portion of said screening structure for receiving an oversize component of said material, and
 vibratory means coupled with said housing structure for vibrating said housing structure and at least said first portion of said screening structure to cause movement of said material from the outer periphery of said first portion toward said discharge opening therein for discharge of said oversize component of said material said means for vibrating including spaced and rotatable eccentric weights.

9. A separator as in claim 8 wherein
 the elongated opening in said pipe of said feed means is disposed with respect to said second portion of said screening structure to cause material to be fed substantially tangentially to said second portion along substantially the entire height thereof.

10. A separator as in claim 9 wherein said pipe of said feed means terminates in an elongated sparger.

References Cited

UNITED STATES PATENTS

| | | | |
|---|---|---|---|
| 310,469 | 1/1885 | Schlatter | 209—380 X |
| 1,078,819 | 11/1913 | Bartholomai | 209—17 X |
| 2,592,605 | 4/1952 | Searles | 209—269 |
| 2,734,631 | 2/1956 | Kobliska | 209—237 |
| 2,818,874 | 1/1958 | Behnke | 209—237 |
| 3,007,575 | 11/1961 | Sylvest | 209—380 X |

HARRY B. THORNTON, *Primary Examiner.*

R. HALPER, *Assistant Examiner.*

U.S. Cl. X.R.

209—311, 332